US012722171B2

(12) United States Patent
Gonzalez Moratiel Alvarez et al.

(10) Patent No.: US 12,722,171 B2
(45) Date of Patent: Sep. 1, 2026

(54) ELECTRONIC PRESSURISED FLUID DISPENSING GUN WITH AUTOMATIC LOCKING MECHANISM

(71) Applicant: SAMOA Industrial S.A., Gijón (ES)

(72) Inventors: Alberto Gonzalez Moratiel Alvarez, Madrid (ES); Luis Miguel Alvarez Pelaez, Siero (ES); Marcos Torre Gomez, Gijon (ES); Ivan Fernandez Bigotes, Gijon (ES)

(73) Assignee: SAMOA Industrial S.A., Gijón (ES)

( * ) Notice: Subject to any disclaimer, the term of this patent is extended or adjusted under 35 U.S.C. 154(b) by 38 days.

(21) Appl. No.: 18/834,903

(22) PCT Filed: Nov. 3, 2022

(86) PCT No.: PCT/IB2022/060581
§ 371 (c)(1),
(2) Date: Jul. 31, 2024

(87) PCT Pub. No.: WO2023/148543
PCT Pub. Date: Aug. 10, 2023

(65) Prior Publication Data

US 2025/0135478 A1 May 1, 2025

(30) Foreign Application Priority Data

Feb. 1, 2022 (ES) .................................. 202230077

(51) Int. Cl.
*B05B 9/04* (2006.01)
*B05B 12/00* (2018.01)
*B05B 12/08* (2006.01)

(52) U.S. Cl.
CPC .......... *B05B 9/0403* (2013.01); *B05B 12/002* (2013.01); *B05B 12/085* (2013.01)

(58) Field of Classification Search
CPC ....... B05B 9/01; B05B 9/0403; B05B 12/002; B05B 12/004; B05B 12/085; B67D 7/425; B67D 7/44
(Continued)

(56) References Cited

U.S. PATENT DOCUMENTS

2009/0314980 A1* 12/2009 Breeser ................. B67D 7/425 222/14
2019/0084823 A1* 3/2019 Norman .................. B67D 7/54
(Continued)

*Primary Examiner* — Luan K Bui
(74) *Attorney, Agent, or Firm* — Calderone McKay LLC

(57) ABSTRACT

This invention relates to an electronic pressurised fluid dispensing gun equipped with a volume metering chamber, a control valve, an automatic locking mechanism controlled by an electronic system which may have wireless communication and a wireless battery charging system. The volume measurement chamber is located downstream of the control valve and outside the pressure line in order to gain more accurate measurements as it is not influenced by the pressure of the fluid and its movements generated by pressure changes or water hammer. The automatic locking mechanism is located at the bottom of the gun such that it does not interrupt the flow of pressurised fluid so that the fluid inlet and outlet through the gun are on the longitudinal plane of the gun and whose automatic locking mechanism does not allow dispensing unless a new dispense command is validated in the gun's electronics module. This automatic locking mechanism will act independently of the trigger stroke, allowing the flow rate to be regulated without the need to lock the trigger in an extreme position.

6 Claims, 7 Drawing Sheets

(58) Field of Classification Search
USPC ................. 222/14, 21, 63, 52, 59, 333, 334; 73/861; 239/526
See application file for complete search history.

(56) References Cited

U.S. PATENT DOCUMENTS

| | | | | |
|---|---|---|---|---|
| 2019/0105676 | A1* | 4/2019 | Kahler | G05D 7/0617 |
| 2023/0415179 | A1* | 12/2023 | Kutz | B05B 9/01 |
| 2024/0228260 | A1* | 7/2024 | Gray | B67D 7/42 |
| 2025/0289015 | A1* | 9/2025 | Renz | B05B 9/0426 |

* cited by examiner

Section A-A

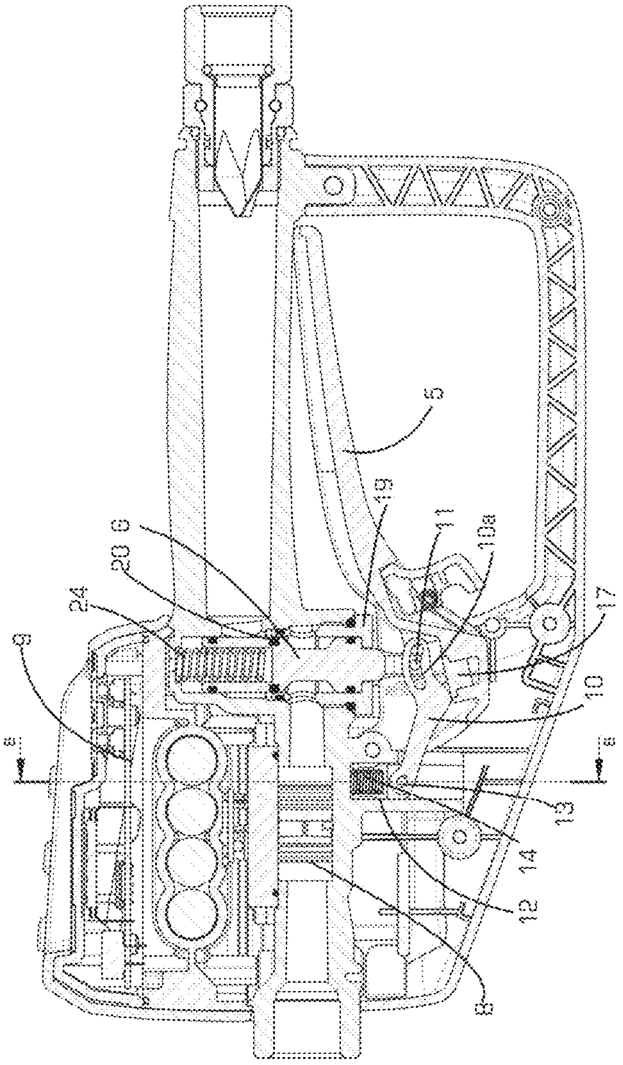
Fig 4
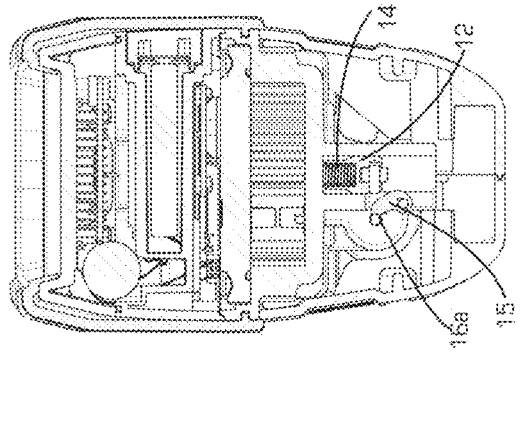
SECTION B-B

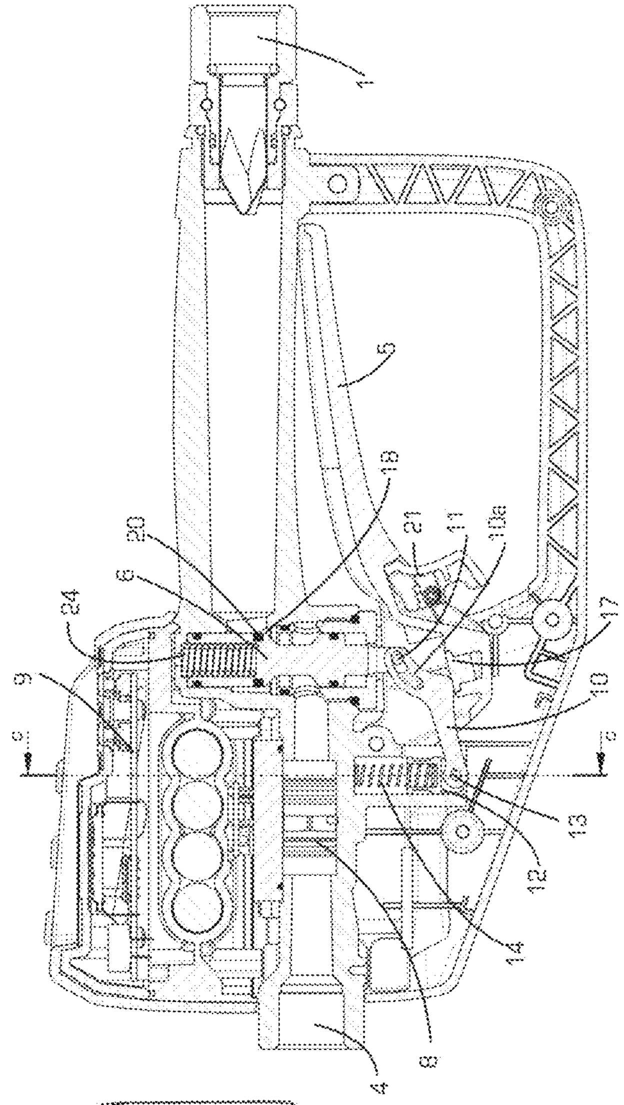
Fig 5
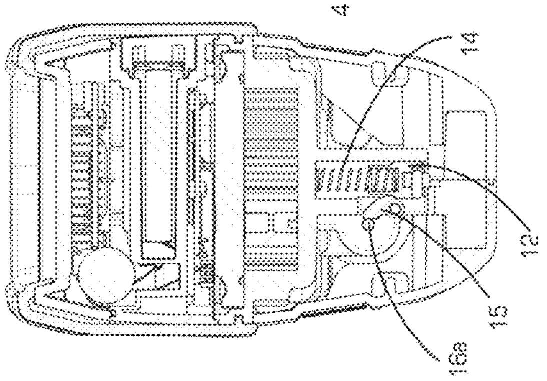
SECTION C-C

ELECTRONIC PRESSURISED FLUID DISPENSING GUN WITH AUTOMATIC LOCKING MECHANISM

BACKGROUND OF THE INVENTION

Field of the Invention

This invention is to be applied within the industrial sector of guns for the dispensing of pressurised fluids, such as hydrocarbons, chlorinated hydrocarbons, acids, bases and other chemical products used in industrial processes.

Description of Related Art

Most of the electronic pre-selection metering guns for pressurised fluid dispensing on the market have mechanisms that do not guarantee the traceability of the quantities dispensed nor are they optimised to allow their operation under minimal force. The type of mechanism present in these guns generally serves the sole function of holding the trigger in an extreme position as well as having manual mechanical position locking to keep the valve open, but always allows fluid to be dispensed. In these mechanisms, as the trigger needs to be held in an extreme position during dispensing, it is not possible to regulate the flow rate during dispensing. Other types of guns equipped with a mechanism that guarantees the traceability of the quantities dispensed have more voluminous mechanisms that do not optimise the mechanism's actuating force and also interfere with the fluid outlet connection, forcing the fluid outlet to be off-centre with respect to the gun handle, which has a negative impact on the ergonomics of the gun. We are unaware of the existence of a fluid dispensing gun where the flow metering element is located downstream of the control valve and outside the pressure line and where the automatic locking mechanism is located at the bottom of the gun such that the fluid inlet and outlet through the gun are on the same longitudinal plane of the gun such that it does not interrupt the flow of fluid under pressure and such automatic mechanism does not allow dispensing unless a new dispense command is validated in the gun's electronics module. This automatic mechanism also allows the dispensing control to be operated independently of the trigger stroke, allowing the flow rate to be regulated without the need to lock the trigger in an extreme position.

BRIEF SUMMARY OF THE INVENTION

This invention relates to a pressurised fluid dispensing gun with a flow metering element, a control valve, an automatic locking mechanism controlled by an electronic system which may include wireless communication and a rechargeable battery power supply system. The flow measuring element is placed downstream of the control valve and outside the pressure line in order to gain more accurate measurements as it is not influenced by the pressure of the fluid and its movements generated by pressure changes or water hammer. The automatic locking mechanism is located at the bottom of the gun in such a way that the fluid inlet and outlet through the gun are on the same longitudinal plane of the gun, so that it does not interrupt the flow of pressurised fluid. This locking mechanism enables, with minimum energy consumption, the flow of fluid to be automatically stopped when a quantity of fluid is reached. This quantity of fluid would have been previously set by the user in the electronics module integrated in the gun itself. Once the pre-set quantity has been reached, regardless of whether the trigger is held down, the mechanism will automatically close the valve incorporated in the fluid dispensing gun by means of a bi-articulated connecting rod which is actuated by the trigger and connects the valve actuation piston with a slide. In addition, this mechanism will prevent fluid being dispensed unless a new dispense command is validated in the gun's electronics module.

BRIEF DESCRIPTION OF THE SEVERAL VIEWS OF THE DRAWING(S)

In order to supplement the description herein and to assist in a better understanding of the features of the invention, a set of drawings is attached hereto as an integral part of the description, which for illustrative purposes, and without limitation, depicts the following:

FIG. 4 shows a longitudinal section of the gun and a cross section "B-B" to display the status of the locking mechanism with manually depressed trigger and closed valve.

FIG. 5 shows a longitudinal section of the valve locking mechanism in the active pre-selection position with the valve open.

DETAILED DESCRIPTION OF THE INVENTION

Figure 1:
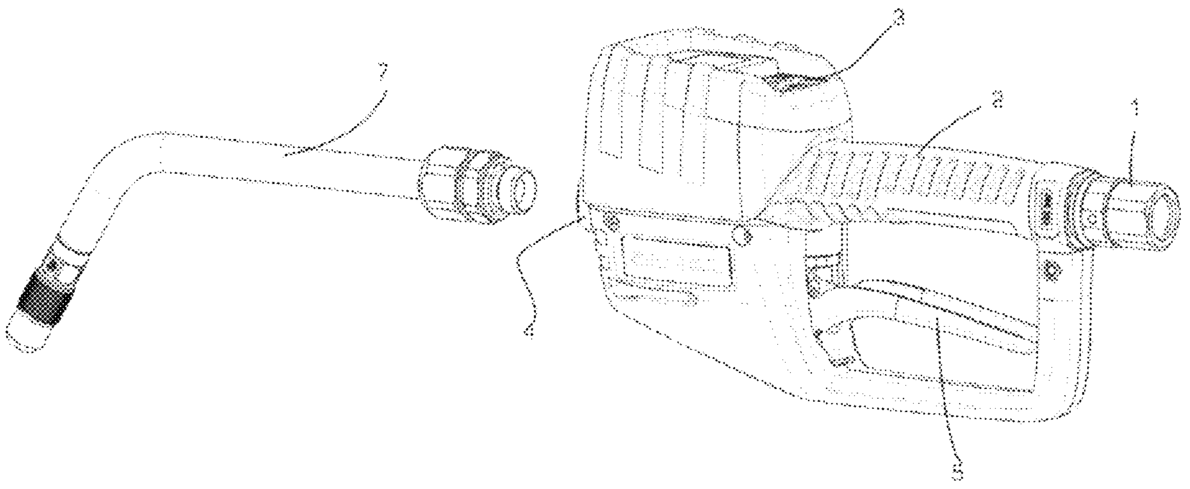
FIG. 1 shows an isometric view of the electronic fluid dispensing gun.

This mechanism is to be applied in portable electronic pre-selection guns for the dispensing of pressurised fluid in industry. The gun allows dispensing only if the operator has validated an order in the electronics module, which can also have wireless communication in order to guarantee the traceability of all dispensed quantities. Once a dispense command is validated, the valve locking mechanism will be responsible for performing the valve closure when the amount of fluid set on the gun by the user is reached.

The electronic gun consists of:

a fluid inlet connection (1), a handle (2) for easy handling,

- an electronic control interface (3) for managing and inputting the quantities of fluid to be dispensed, which may include wireless communication for connection with other management systems external to the gun.
- a wireless battery recharging system comprising the receiver (29) and the charging station (28); and a manually operated trigger (5) for opening and closing the fluid flow valve (6), a measuring chamber (8) for measuring the volume of fluid transferred and communicating it to the electronics module (9) and, an outlet connection (4) to which a nozzle extension (7) is attached to prevent fluid dripping and to direct the fluid flow to the outlet.

The valve (6) allows the passage of fluid between the inlet (1) and outlet (4), passing on its way through the measuring chamber (8) in charge of registering the transferred fluid and communicating it to the electronics module (9). The O-ring (20) mounted on the valve (6) is responsible for closing the passage of fluid.

The automatic valve locking mechanism consists of:

a valve (6), a connecting rod (10), a pin (11) that connects the valve (6) to the connecting rod (10) and slides along the groove (10*a*), a slide (12), a pin (13) connecting the connecting rod (10) to the slide (12), a spring (14), a cam pawl (15)

a torsion spring (30) and, a solenoid (16) whose stem (16*a*) moves linearly by retracting and extending when receiving an electrical signal from the electronics module (9).

The solenoid (16) is controlled by the electronics module (9) and operates with minimum energy consumption thanks to the special design of the cam pawl (15), which is kept in contact with the slide (12) by the torsion spring (30), and the connecting rod (10) which make up the mechanism and are responsible for reducing the force exerted by the valve (6) and reducing the force received by the stem (16*a*).

As shown in FIG. 5, once the quantity to be dispensed has been entered, the trigger (5) interacts with the locking mechanism to move the valve (6) and allow the fluid to pass through the channel (18) from the inlet connection (1) to the outlet (4) of the gun.

After passing through the valve, the fluid passes through the metering chamber (8) which registers the volume transferred and this is recorded by the electronic control module (9).

Once the quantity of fluid set in the electronics module (9) has been reached, a signal is sent to the solenoid (16) which retracts the stem (16*a*) and then the locking mechanism closes the valve (6), stopping the flow of fluid as shown in FIG. 4. This will occur regardless of the position of the trigger (5) and will prevent further dispensing until a new amount of fluid is entered and validated at the control interface (3). If a dispense command is not activated, even if the trigger (5) is actuated, valve opening will not occur due to the design of the locking mechanism. This ensures that all dispensing is recorded and guarantees traceability.

Preferred Implementation of the Invention

Figure 2:
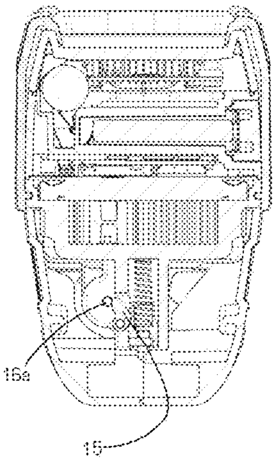
FIG. 2 shows a longitudinal section of the gun and a cross section "A-A" to visualise the state of the locking mechanism at rest without an active dispense command.
Figure 2:
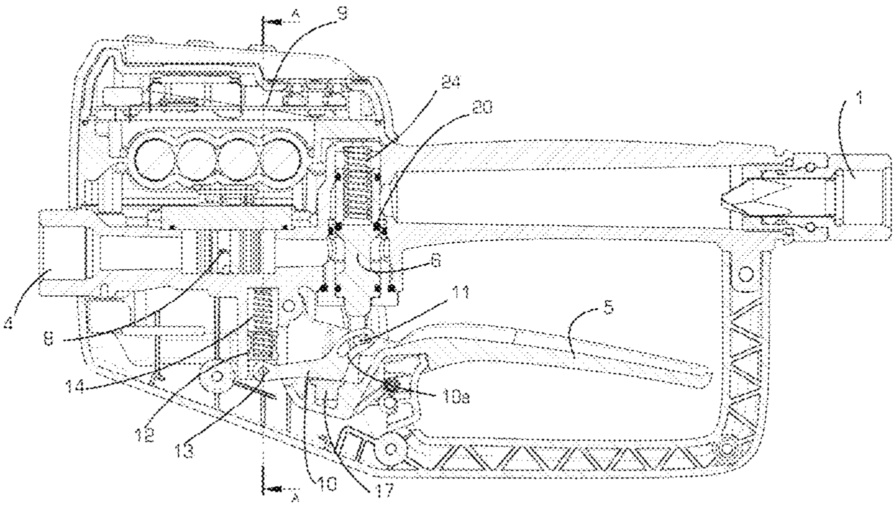

FIG. 2 shows a section of the gun in the state in which a dispense command has not been entered at the control interface (3) and therefore no fluid dispensing is enabled despite the trigger (5) being pulled. Actuating the trigger (5) causes the stop (17) inserted in the trigger to move the connecting rod (10). The connecting rod (10) is articulated at one end with the slide (12) by means of the pin (13) and is guided at the other end by means of the groove (10*a*) with the pin (11) attached to the valve (6). The special design of the connecting rod (10) generates different vertical forces on the pins (11) and (13). The force generated on the pin (11) is less than the retention force of the spring (24) so that the valve (6) does not move, while the force on the pin (13) is greater than the force exerted by the spring (14) so that the slide (12) starts to move and the valve (6) remains immobile. The slide (12) moves freely when it comes into contact with the pawl (15) by moving it. FIG. 4 shows the final position of the mechanism with the trigger (5) pressed down, the slide (12) moved to the upper point by the movement of the connecting rod (10) and the valve (6) in the closed position preventing the passage of fluid.

Figure 3A:
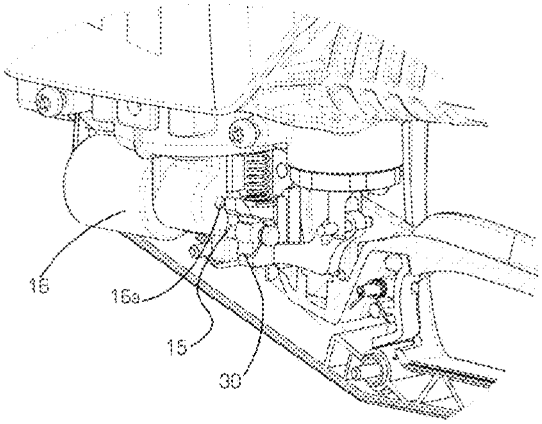
FIG. 3A shows an isometric view of the locking mechanism in the disengaged position.
Figure 3B:
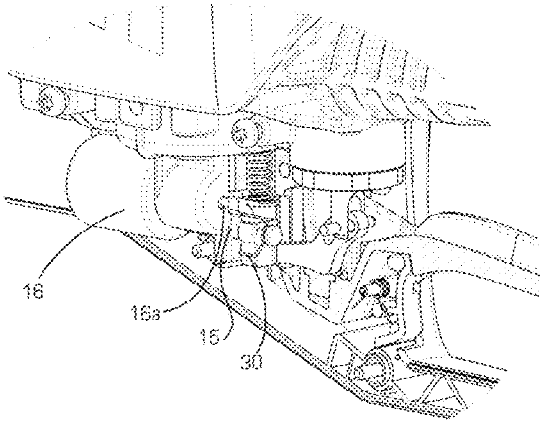
FIG. 3B shows an isometric view of the locking mechanism in the activated position.
Figure 6:
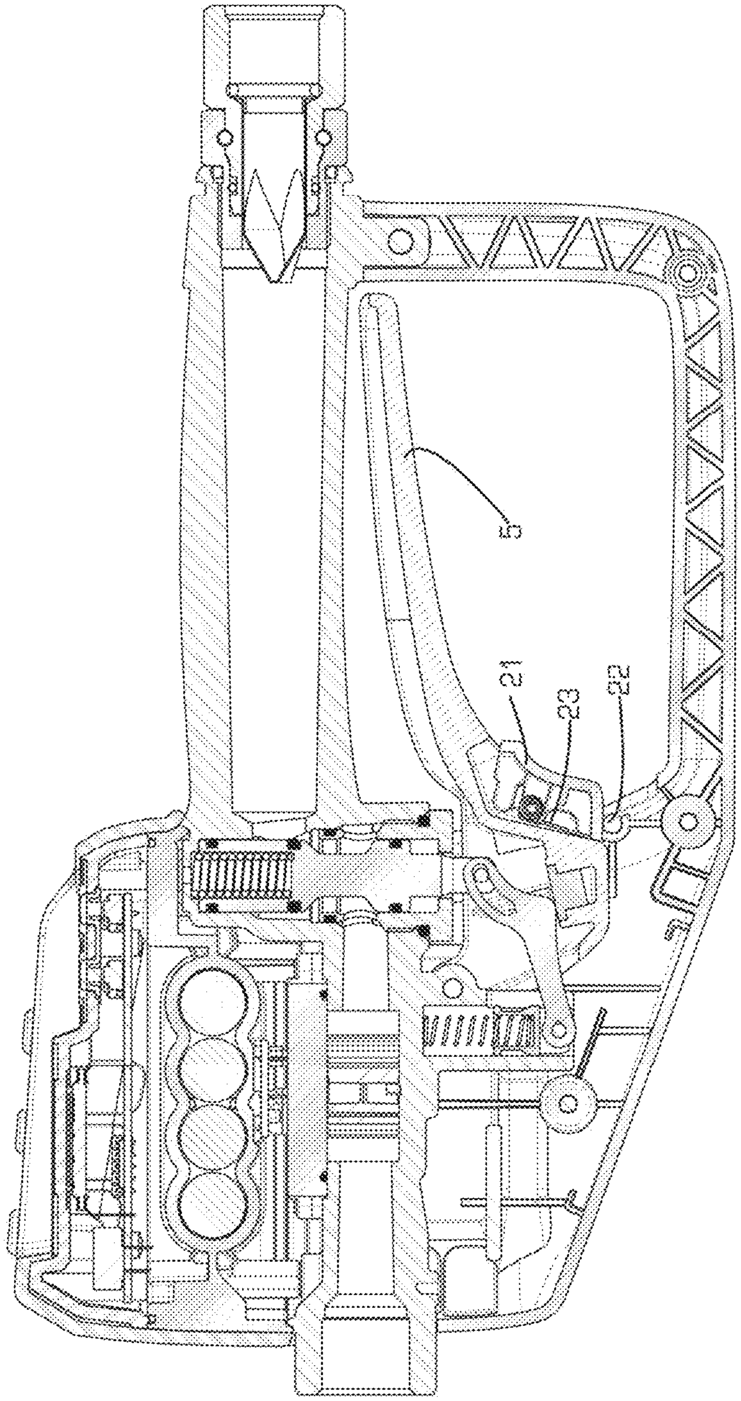
FIG. 6 shows a longitudinal section of the gun displaying the status of the locking mechanism, in valve open position, with trigger.

Starting from the state described in FIG. 2, a state in which fluid dispensing is prevented, a dispensing activation from the electronics module (9) causes the extension of the solenoid stem (16*a*) shown in FIG. 3B. The extension of this stem (16*a*) prevents the ratchet (15) from turning anticlockwise. In this situation, as can be seen in FIG. 5, pressing the trigger (5) causes the stop (17) to exert force on the connecting rod (10), which in turn exerts force on the slide (12) and on the pin (11) that connects to the valve (6). The slide (12) exerts force on the pawl (15) which is prevented from moving when it comes into contact with the stem (16*a*) of the solenoid (16). The connecting rod (10) hinged on the slide (12) is prevented from moving vertically at the point of articulation (13) with the slide (12), so that the only possibility of movement of the connecting rod is the connecting pin (11) with the valve (6). The increase of the actuation force on the trigger (5) produces the compression of the spring (24) of the valve (6), generating the displacement of the trigger (5) in an upward movement and the opening of the valve (6), that moves towards its upper point. The movement of the valve (6) allows fluid to pass through the channel (18) towards the chamber (8) and then to the outlet connection (4). The volume of fluid transferred through the measuring chamber (8) is recorded by the electronics module (9). The trigger (5) can be held in manual operation or can be locked by pressing the button (21). FIG. 6 shows the locking of the trigger (5) by means of the button (21) which is actuated at the same time as the trigger (5) is lowered until contact is made between the locking button (21) and the pin (22) inserted in the body of the gun. Once this position has been reached, the trigger can no longer be manually operated and the valve will remain in the previously actuated fluid flow position. To unlock the trigger, simply pull the trigger (5) slightly and the torsion spring (23) will return the locking button to its initial rest position.

Once the transferred volume reaches the user-set amount, the electronics module feeds the solenoid (16) for a time of less than 100 milliseconds by retracting its stem (16*a*) as shown in FIG. 3*a*. The retraction of the rod (16*a*), previously in contact with the pawl (15), allows the pawl to turn anticlockwise and the slide (12), whose movement was limited by the pawl (15), is no longer prevented from moving in a linear direction. In this situation, due to the peculiar design of the connecting rod (10) and the different stiffness of the slide spring (14) and valve spring (24), the slide spring (14) is compressed while the valve spring (24) is extended. FIG. 4 shows how the valve spring (24) pushes the valve (6) in its extension until it stops against the seal holder (19). The displacement of the valve (6) causes the connecting rod (10) to slide in the groove (10*a*) through the pin (11) of the valve, with this movement generating the vertical ascent of the slide (12) articulated in the pin (13) with the connecting rod while compressing the slide spring (14). The downward movement of the valve (6) closes the passage of the fluid (18) via the seal (20) and thus stops dispensing. The cessation of force on the trigger (5) causes a return to the initial state described in FIG. 2.

Figure 7:
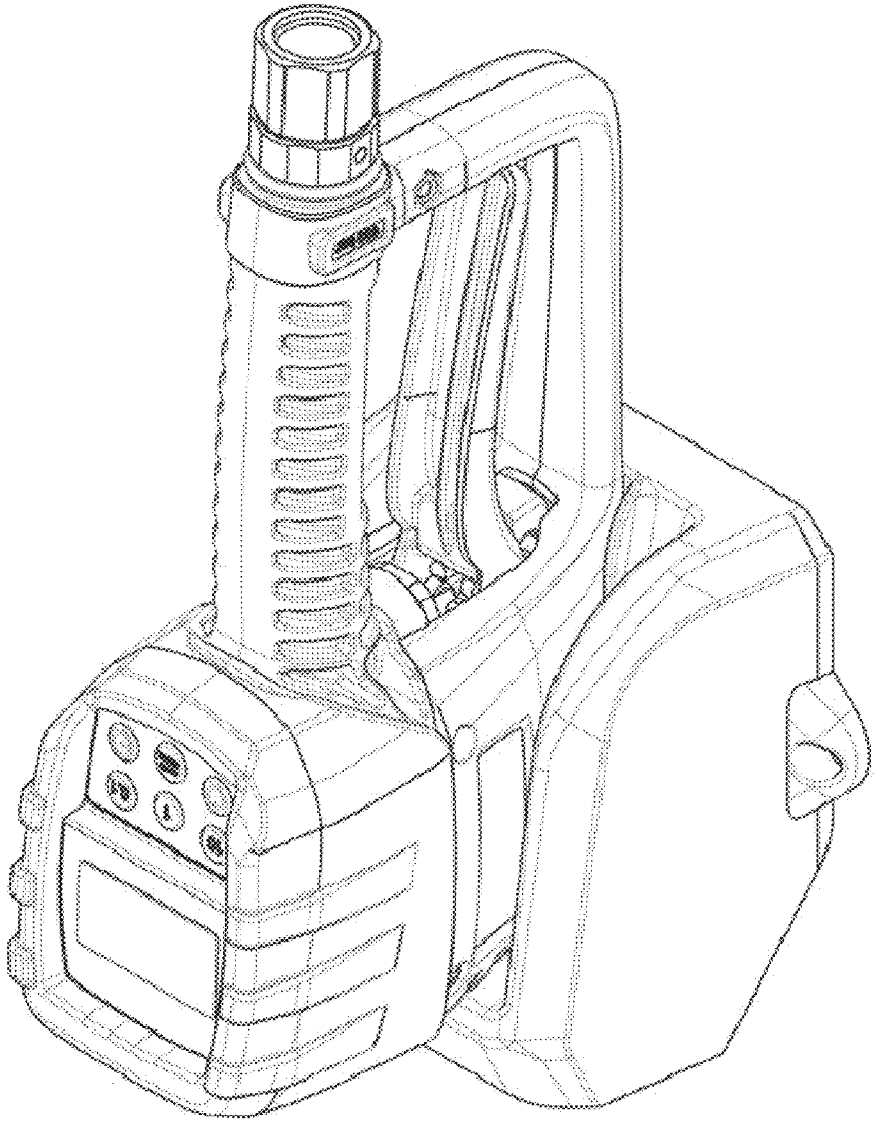
FIG. 7 shows an isometric view of the gun mounted on the wireless charging cradle.
Figure 8:
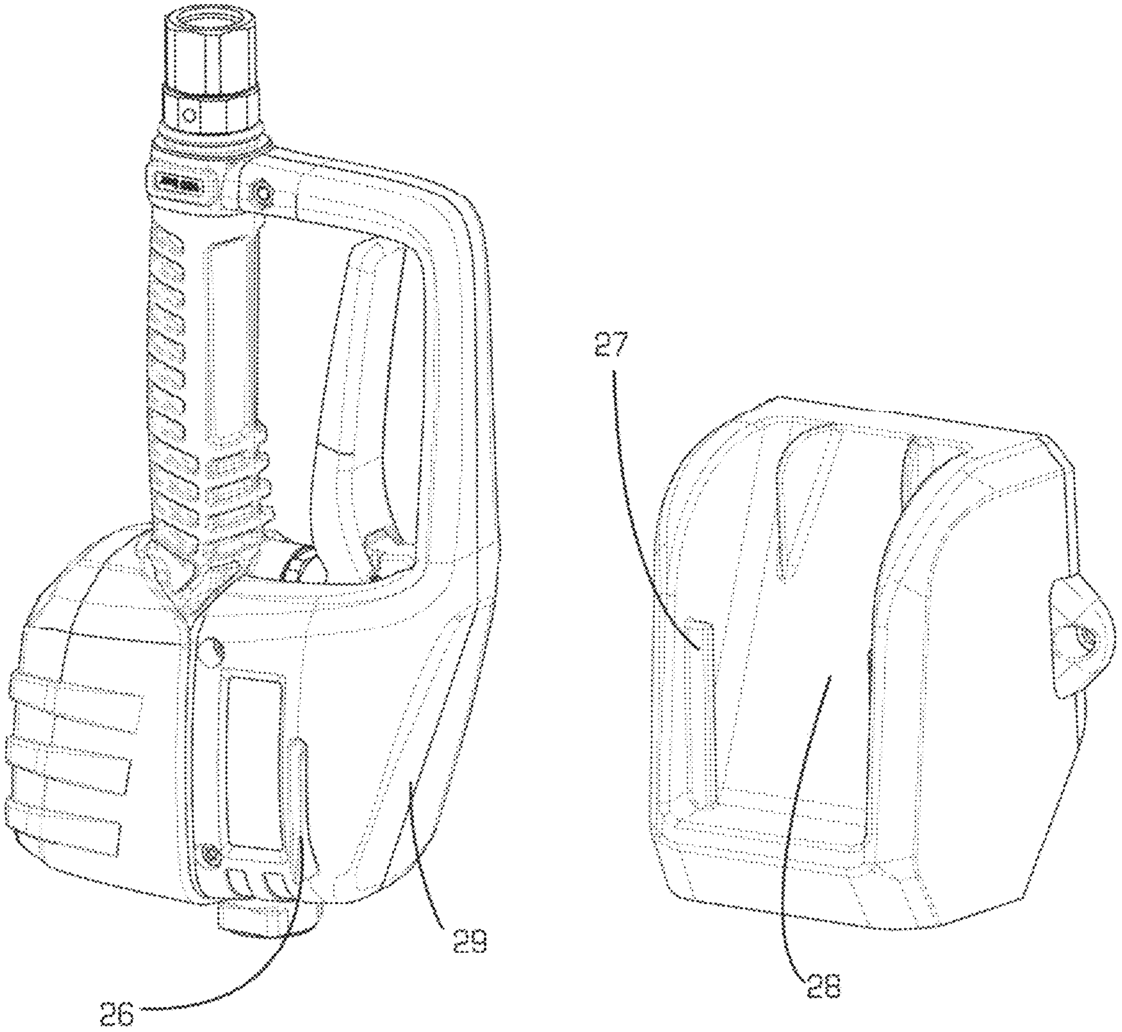
FIG. 8 shows an isometric view of the main components of the wireless charging system.

FIG. 7 shows an assembly of the Electronic Fluid Dispensing Gun mounted on the wireless charger. FIG. 8 shows all components of the wireless charging system identified. The Electronic Fluid Dispensing Gun clamping guides (26) are used to hold the gun in its charging position on the bracket clamping guides (27). The wireless charging stand (28) has an area where the wireless charging transmitter is located and the gun has a flat area (29) where the receiver of the wireless charger is located, therefore, when the gun is resting on the stand, the batteries are charged.

The invention claimed is:

1. An electronic pressure fluid dispensing gun comprising,
- a fluid inlet connection,
- a handle for easy handling,
- an electronic control interface for managing and entering the quantities of fluid to be dispensed,
- a wireless battery recharging system on the gun comprising a receiver, and a charging station,
- a manually operated trigger for opening and closing a control valve,
- a measuring chamber responsible for measuring a volume of fluid transferred and communicating the measured volume to an electronics module, wherein the measuring chamber is downstream of the control valve and outside a pressure line,
- an outlet connection to which a nozzle extension is attached to prevent a dripping of fluid and to direct a fluid flow to the outlet, and
- an automatic valve locking mechanism, located in a lower part of the gun, without interrupting flow of a fluid under pressure in such a way that a fluid inlet and a fluid outlet through the gun are on a longitudinal plane of the gun, and consisting of:
  - the control valve, wherein the control valve is automatically closed by the locking mechanism when a quantity of fluid to be dispensed is reached, which prevents a dispensing of the fluid unless a new dispensing order is validated in the electronics module of the gun,
  - a connecting rod,
  - a slide,
  - a first pin that connects the connecting rod to the slide,
  - a second pin that connects the control valve to the connecting rod and that slides along a groove,
  - a slide spring,
  - a cam pawl,
  - a torsion spring, and
  - a solenoid having a stem which moves linearly by retracting and extending when receiving an electrical signal from the electronics module, and
- wherein the automatic valve locking mechanism also includes the manually operated trigger which actuates the connecting rod which is hinged at one end by the first pin which joins it to the slide which slides in a housing, wherein the slide is linked to the connecting rod, the slide contacts the cam pawl, which is kept in contact with the slide by the torsion spring, and will act independently of the stroke of the manually operated trigger, allowing the flow rate to be regulated without the need to lock the manually operated trigger in an extreme position.

2. The electronic pressurised fluid dispensing gun according to claim 1, wherein the automatic valve locking mechanism is arranged such that it does not interrupt the flow of pressurized fluid, the fluid inlet and the fluid outlet are arranged on a same longitudinal plane of the gun, and the automatic valve locking mechanism is configured to, automatically close the control valve when the quantity of fluid to be dispensed, pre-set in the electronics module, is reached.

3. The electronic pressurised fluid dispensing gun with the automatic valve locking mechanism according to claim 1, wherein
- the manually operated trigger which actuates the connecting rod is articulated at one end of the connecting rod by means of the first pin which joins it to the slide which slides along the housing,
- wherein the connecting rod at another end the groove through which slides the second pin attached to the end of the control valve that opens and closes a passage of the flow of fluid, wherein the slide is held in an extreme position by the slide spring which returns it to an initial position of the slide when the force on the trigger is released
- and wherein when no external force is exerted, the control valve is maintained in the closed position in the flow of fluid by an action of a valve spring.

4. The electronic pressurised fluid dispensing gun with the automatic valve locking mechanism according to claim 3, wherein the slide and connected to the connecting rod contacts the cam pawl, which is kept in contact with the slide by the torsion spring, the movement of which can be limited by the extension of a rod actuated by the solenoid which receives an electrical signal from the electronics module with which the user interacts.

5. The electronic pressurised fluid dispensing gun with the automatic valve locking mechanism according to claim 4, wherein the manually operated trigger can be kept locked without manual intervention, in a dispensing position with the control valve open, by means of a button integrated in the manually operated trigger itself, which engages with a third pin integrated in the body of the gun.

6. The electronic pressurised fluid dispensing gun with the automatic valve locking mechanism according to claim 1, wherein the electronics module has wireless communication for connection with other management systems external to the gun.

* * * * *